July 24, 1956 — E. GREACEN, JR — 2,755,497
DISPOSABLE CLEANING DEVICE
Filed June 27, 1950
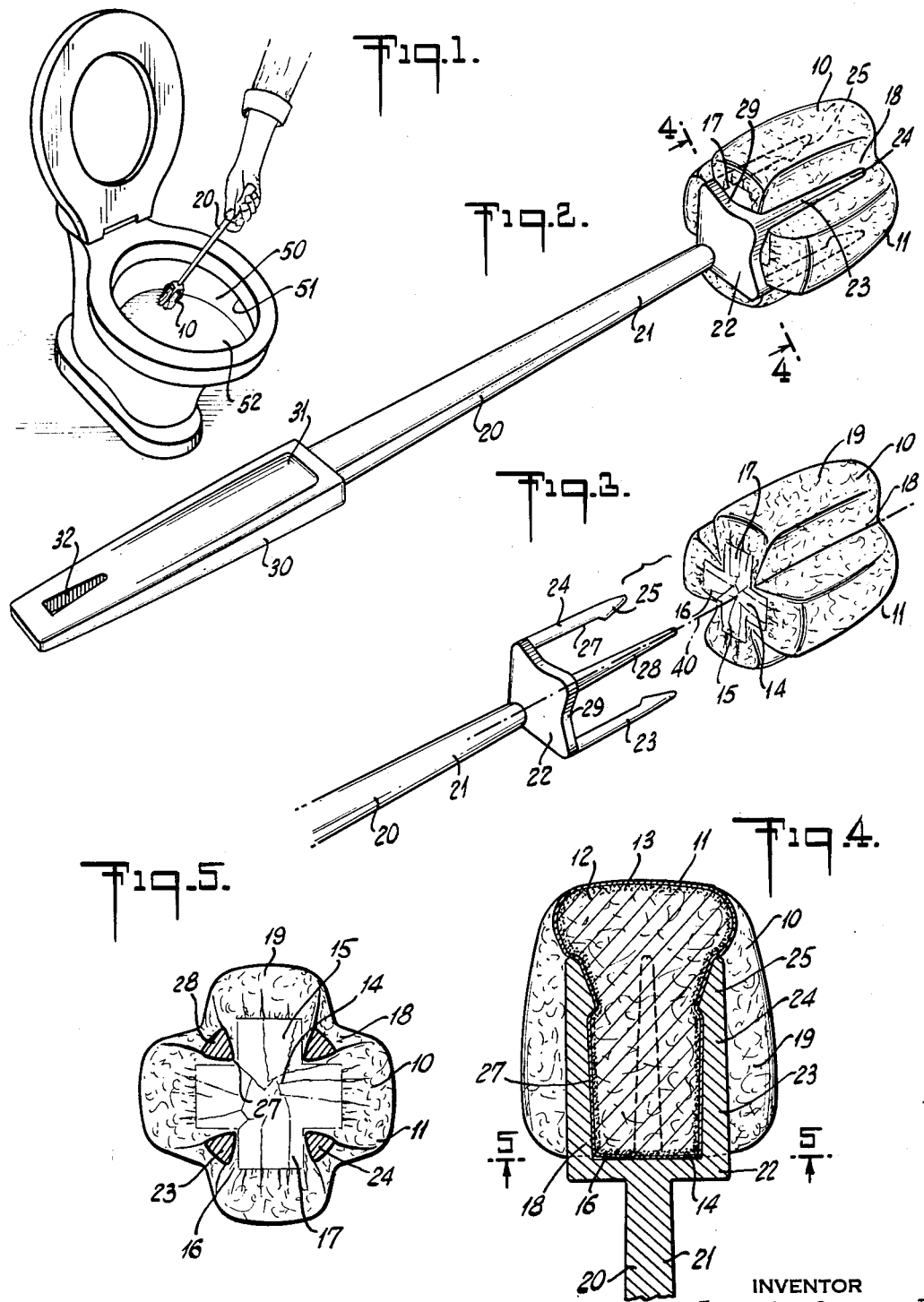
INVENTOR
EDMUND GREACEN JR.
BY Norman St. Landau
ATTORNEY

United States Patent Office 2,755,497
Patented July 24, 1956

2,755,497
DISPOSABLE CLEANING DEVICE

Edmund Greacen, Jr., White Plains, N. Y., assignor, by mesne assignments, to Personal Products Corporation, Milltown, N. J., a corporation of New Jersey Application June 27, 1950, Serial No. 170,669

9 Claims. (Cl. 15—210)

This invention relates to cleaning devices and has special reference to devices used in cleaning processes where liquid is used as cleaning agent. The invention is concerned particularly with cleaning devices for use in the home, for instance, to clean a toilet bowl or other ceramic bowl.

Earlier toilet bowl cleaners had numerous disadvantages. The conventional toilet brush, for instance, has a permanent, not disposable and sometimes odor-collecting working part which has to be retained in or around the bathroom for repeated use. Several devices having disposable working parts present a difficult problem of separating the working part from the permanent handle used. Some other bowl cleaners are either too unreliable in operation or too expensive and difficult to construct to make their use practical.

It is a primary object of this invention to provide a cleaning device having a disposable working part which may be separated readily from the permanent handle. It is a further object to provide a cleaning device wherein the handle may be separated readily from the disposable working part without the necessity of direct manual separation. Still further objects of the invention are the provision of a reusable handle permitting ready separation of a disposable working part and of an efficient, novel, disposable working part that may be separated readily from a permanent handle and that, in operation, does not mar ceramic surfaces. Another object of the invention is the provision of devices of the type described that are economical and easy to manufacture and convenient in use.

Other objects and advantages of the invention will be understood readily from the detailed description thereof, particularly when reference is made to the accompanying drawing wherein similar numerals refer to similar parts, and wherein:

Fig. 1 is a perspective view showing a cleaning device in accordance with the invention in use in the cleaning of toilet bowls;

Fig. 2 is a perspective view showing the assembled cleaning device by itself;

Fig. 3 is a perspective view showing the working part of the cleaning device and a portion of the handle immediately before assembly of the two parts;

Fig. 4 is a partial view through line 4—4 of Fig. 2; and,

Fig. 5 is a horizontal section through line 5—5 of Fig. 4.

Essentially the cleaning device of the invention has two components:

1. A disposable and disintegrable cleaning pad comprising particulate cleansing material, held within a flexible outer skin which is sealed at one end by a water disintegrable seal; and, 2. A permanent handle part comprising a long handle and a gripping part, a base and a connecting fork for the cleansing pad.

As will appear readily the two parts are formed to provide most satisfactory service when used in conjunction with each other, but each part may be used without the other if this is desirable.

The cleaning pad 10 has substantial bulk as shown in Fig. 3 and is based usually on soft conforming fibrous sheet material as outer wall 11. This fibrous material, in preferred embodiments of the invention, is a non-woven fibrous sheet, united at spaced intervals by adhesive layers and disclosed in Goldman Patent 2,039,312, issued May 5, 1936. Other less satisfactory but useful materials for the purpose of this invention are the softer grades of parchment paper, and heavy tissue papers such as those used in commercial cleansing tissues. Within this fabric wall there is placed particulate cleansing materials 12 such as a heavy cellulose pulp, for instance alpha cellulose pulp, bleached or unbleached, or any other desired fibrous, disintegrable material.

For best results, any one of the conventional detergents or chemical agents, adapted to aid and intensify the cleaning operation, may be placed adjacent the outer wall as illustrated at 13 or distributed evenly throughout the particular filler. Scouring material and deodorant may be added to the detergent or used separately. The particulate material is fully enclosed within the outer wall and a slight overlap 14 of the ends 15 of the outer wall is provided at one spot.

The cleaning pad formed in accordance with the description above is preferably compressed in a die to give it alternate depressions 18 and protrusions 19 disposed symmetrically about an axis of the pad perpendicular to said overlap and the cross section of a maltese cross in a plane parallel to the overlap. It tapers lengthwise slightly in the direction away from the overlap. The overlap is sealed by a water-soluble adhesive pressed into a seal 16 along the large part of the center of the maltese cross surface presented. If desired, a label 17 may be applied to the overlapped seal 16.

A typical water-soluble adhesive for sealing the overlap is cornstarch. A solution comprising one teaspoon of cornstarch per half pint of water may be applied to the overlap and a satisfactory seal is formed after compression and heat drying, for instance under the pressure of a hot iron. The specific type of adhesive, however, forms no part of the invention and many other adhesives are available in the art for this purpose. Any water-soluble adhesive and any adhesive the bond of which weakens due to the action of water may be selected, for instance, methyl cellulose, sugar, corn syrup, molasses, carboxymethyl cellulose, carboxyethyl cellulose, polyvinyl alcohol, casein, glue, and any other water-soluble agglutinant.

The permanent handle has a stem 21, a base 22 and a fork 23 composed of individual resilient prongs 24 emanating from said base 22. The resilient prongs 24 are arranged so as to fit into the depressions 18 of the cleansing pad 10. Four prongs 24 are shown in the drawing to fit the maltese cross construction of the cleansing pad 10 illustrated. Of course, where more or fewer prongs are desired, the pad may be formed accordingly and a desired number of prongs may be substituted. At least three prongs are preferred, however. Each resilient prong 24 has at its end a barb 25 directed inwardly toward the longitudinal axis 40 of the handle and rounded outwardly toward its outermost end. Preferably the barbs and the prongs have bullet-shaped cross sections presenting a fine edge 27 toward the longitudinal axis 40 of the handle as illustrated in Fig. 5 and are flattened into a broad reinforcement 28 away from it. This shape makes it convenient to slide the prongs 24 into gripping position on the pad 10 and the shape of the barbs 25 aids in securing a satisfactory hold on the pad once it is applied. It is preferred to have indentations 29 in the base between prongs 24 so that the largest possible area of the seal 16 is exposed when the cleaning pad is in position.

The handle may have a gripping part 30, which may comprise a thumb rest 31 and attaching means for the device, e. g. opening 32. The handle is composed usually of a resilient plastic material but may also be formed of strong resilient wood or fiber material. The preferred plastics used are phenol formaldehyde resins, phenol-furfural resins, ethyl cellulose, cellulose acetate, including high acetyl cellulose acetate, cellulose acetate butyrate, cellulose propionate, cellulose nitrate, polyethylene, polytetrafluoro ethylene, nylon, and chlorinated rubber.

In Fig. 3 there is illustrated the manner in which the handle 20 and the disposable cleaning pad 10 are assembled for use. The handle is connected to the pad 10 by pressing the prongs 24 longitudinally down along the longitudinal depressions 18, intermediate the protrusions 19, until the base 22 of the handle 20 rests firmly against the seal 16. The cleaner is now in operative position. A bowl 50 may be cleaned readily as illustrated in Fig. 1 in the manner in which it would normally be cleaned using a brush. When the cleaning job is completed one or more of the portions of the disposable pad are pressed against any portion of the bowl, for instance, the rim 51 of the toilet bowl and the handle is withdrawn from the removable pad. The disposable pad 10 drops into the liquid 52 of the bowl and the seal 16, which is normally weakened partially during the cleaning operation, is fully exposed to the further weakening action of the bowl liquid 52. Accordingly, the seal 16 releases the end 15 at overlap 14 and the particulate cleansing materials 12 can now leave the outer wall 11 freely. Where special detergents, cleaning agents, or deodorants are present inside the pad this release has the effect of an additional cleansing step on the bottom of the bowl. On disposal of the liquid 52, for instance by flushing the toilet bowl, the outer wall 11 and the particulate cleansing materials 12 of the disposable pad 10 are flushed away. They may now disintegrate fully. The handle 20, which in operation is fully protected by the protrusions 19 of the pad, is not soiled in any way and is ready for the next operation.

It is noted that the invention provides means of cleaning without touching the disposable cleaning member at any time and without adverse effect on a ceramic bowl. The products of the invention are practical, economical, and very efficient. Many other modifications will occur readily to those skilled in the art and are included in the inventive concept of this specification.

The claims are:

1. A cleaning device comprising a disposable cleaning pad having a plurality of protrusions presenting cleaning surfaces and intermediate depressions, a water-sensitive member arranged at one end of the pad and operating releasably to support said protrusions and depressions in working relationship, and a holder for said cleaning pad comprising a handle, a base and a plurality of prongs being disposed to fit in said depressions within the confines of said cleaning pad and to engage it, said base serving as a cover for said water-sensitive member when said cleaning pad is in operative position.

2. A cleaning device comprising a disposable cleaning pad having a plurality of protrusions presenting cleaning surfaces and intermediate depressions, a water-sensitive member releasably supporting said protrusions and depressions in operative relationship, and a holder for said cleaning pad comprising a handle, a base and a plurality of prongs arranged to correspond and cooperate with said depressions within the confines of said cleaning pad, and to engage it, said base serving as a cover for said water-sensitive member when said cleaning pad is in operative position, and said prongs having near their ends barbs directed inwardly toward the operative position of said disposable cleaning pad.

3. A cleaning device comprising a disposable cleaning pad having a plurality of protrusions presenting cleaning surfaces and intermediate depressions, and having a water-sensitive member, said cleaning pad being composed of disposable particulate cleansing material within a disposable outer wall, and having a water-sensitive member arranged at one end of the pad and operating to releasably seal said particulate cleaning material within said wall and retaining said depressions and protrusions in operative relationship, and a holder for said cleaning pad comprising a handle, a base and a plurality of prongs spaced to fit in said depressions within the confines of said cleaning pad, and to engage it at the base of said depressions, said base serving as a cover for said water-sensitive member when said cleaning pad is in operative position, whereby on separation of said holder from said cleaning pad, said moisture-sensitive member is exposed and adapted for release of said pad on exposure thereof to moisture.

4. A cleaning device comprising a disposable cleaning pad having a plurality of protrusions presenting cleaning surfaces and intermediate depressions, and having a water-sensitive member arranged at one end of the pad and operating to releasably support said protrusions and depressions in operative relationship, and a holder for said cleaning pad comprising a handle, a base and a plurality of prongs disposed to fit in said depressions within the confines of said cleaning pad, and to engage it, said base having recesses between said prongs and serving as a cover for the center part of said water-sensitive member but to provide access through said recesses to the margins of said water-sensitive member, while said pad is in operative position.

5. A disposable cleaning pad of substantial bulk and having a plurality of protrusions and a corresponding plurality of intermediate depressions both disposed substantially symmetrically about an axis of the pad extending in one direction, a flexible disposable outer fabric wall covering said protrusions and extending into said depressions and folded to provide an overlap at one end of the pad through which said axis extends, said overlap, when sealed, serving to support said protrusions and depressions in a working relationship wherein the fabric wall covering the protrusions presents a cleaning surface, disposable particulate cleaning material held within said fabric wall, and a moisture-sensitive seal releasably covering said overlap and enclosing said particulate material within said wall, said pad being adapted for use with a holder having a base with a plurality of prongs extending therefrom and, when so used, being retained in the holder by engagement of such prongs within said depressions and having its seal covered by said base.

6. A disposable cleaning pad according to claim 5 wherein the particulate cleaning material held within the fabric wall has detergent properties.

7. A disposable cleaning pad according to claim 5 wherein there is also enclosed within said fabric wall a deodorant material.

8. A disposable cleaning pad according to claim 5 wherein adjacent to and within the fabric wall there is provided a chemical agent adapted to aid and intensify the cleaning operation.

9. A disposable cleaning pad according to claim 5 wherein adjacent to and within said fabric wall there is provided a detergent adapted to aid and intensify the cleaning agent.

References Cited in the file of this patent

UNITED STATES PATENTS

| Number | Name | Date |
|---|---|---|
| 938,421 | Hakins | Oct. 26, 1909 |
| 1,169,490 | Joseph | Jan. 25, 1916 |
| 1,219,147 | Picard | Mar. 13, 1917 |
| 1,553,775 | Hertz | Sept. 15, 1925 |
| 1,631,791 | Buckley | June 7, 1927 |
| 2,038,958 | Reach | Apr. 28, 1936 |
| 2,125,099 | Brooks | July 26, 1938 |
| 2,271,861 | Harris | Feb. 3, 1942 |
| 2,288,353 | Hiatt | June 30, 1942 |
| 2,296,133 | Wolfe | Sept. 15, 1942 |
| 2,496,371 | Baker | Feb. 7, 1950 |
| 2,560,649 | Hornaday | July 17, 1951 |